United States Patent [19]

Grimsley

[11] Patent Number: 4,631,542
[45] Date of Patent: Dec. 23, 1986

[54] POLICE RADAR WARNING RECEIVER WITH MUTE FUNCTION

[75] Inventor: Richard L. Grimsley, Cincinnati, Ohio

[73] Assignee: Cincinnati Microwave, Inc., Cincinnati, Ohio

[21] Appl. No.: 656,029

[22] Filed: Sep. 28, 1984

[51] Int. Cl.$^4$ .......... G01S 7/40; H04B 17/00; G08B 7/00
[52] U.S. Cl. .......... 342/20; 455/227; 340/502; 342/70
[58] Field of Search .......... 343/18 E, 7 VM; 455/226–229; 340/502, 517, 600

[56] References Cited

U.S. PATENT DOCUMENTS

| 3,107,348 | 10/1963 | McNeill | 340/213 |
| 3,112,475 | 11/1963 | Alessio | 340/226 |
| 3,165,724 | 1/1965 | Ida | 340/213.2 |
| 3,193,814 | 7/1965 | Foster | 340/223 |
| 3,254,331 | 5/1966 | Ida et al. | 340/213.2 |
| 3,287,717 | 11/1966 | Kraus | 340/213 |
| 3,357,008 | 12/1967 | Walsh | 340/213.1 |
| 3,381,286 | 4/1968 | Walsh | 340/213.1 |
| 3,392,379 | 7/1968 | Thomason et al. | 340/213.1 |
| 3,456,251 | 7/1969 | Smith et al. | 340/213.1 |
| 3,480,938 | 11/1969 | Martin | 340/213.1 |
| 3,495,231 | 2/1970 | Takaya et al. | 340/213 |
| 3,512,147 | 5/1970 | Martin | 340/213.1 |
| 3,518,653 | 6/1970 | Thomas | 340/213.1 |
| 3,533,093 | 10/1970 | Webb | 340/213.1 |
| 3,548,399 | 12/1970 | Monigal et al. | 340/253 |
| 3,582,925 | 6/1971 | Porter, Jr. | 340/213.1 |
| 3,686,654 | 8/1972 | Judlowe | 340/213.1 |
| 3,688,294 | 8/1972 | Erpelding, Jr. | 340/213.1 |
| 3,893,091 | 7/1975 | Lee | 340/502 |
| 3,942,166 | 3/1976 | Peral et al. | 340/213.1 |
| 3,984,825 | 10/1976 | Fujita | 340/213.1 |
| 4,313,216 | 1/1982 | Jaeger et al. | 343/55 A X |
| 4,549,141 | 10/1985 | Teass, Jr. | 324/441 |

Primary Examiner—T. H. Tubbesing
Assistant Examiner—Gilberto Barrón, Jr.
Attorney, Agent, or Firm—Wood, Herron & Evans

[57] ABSTRACT

A radar warning receiver is provided having an alarm indicator responsive to an electronic switch, the switch being activated and energizing the alarm in response to an alarm signal indicating the presence of a police radar signal, the switch being deactivated and de-energizing the alarm in response to a mute signal occurring during the occurrence of the alarm signal, the switch remaining deactivated until the alarm condition signal terminates and subsequently reoccurs.

16 Claims, 1 Drawing Figure

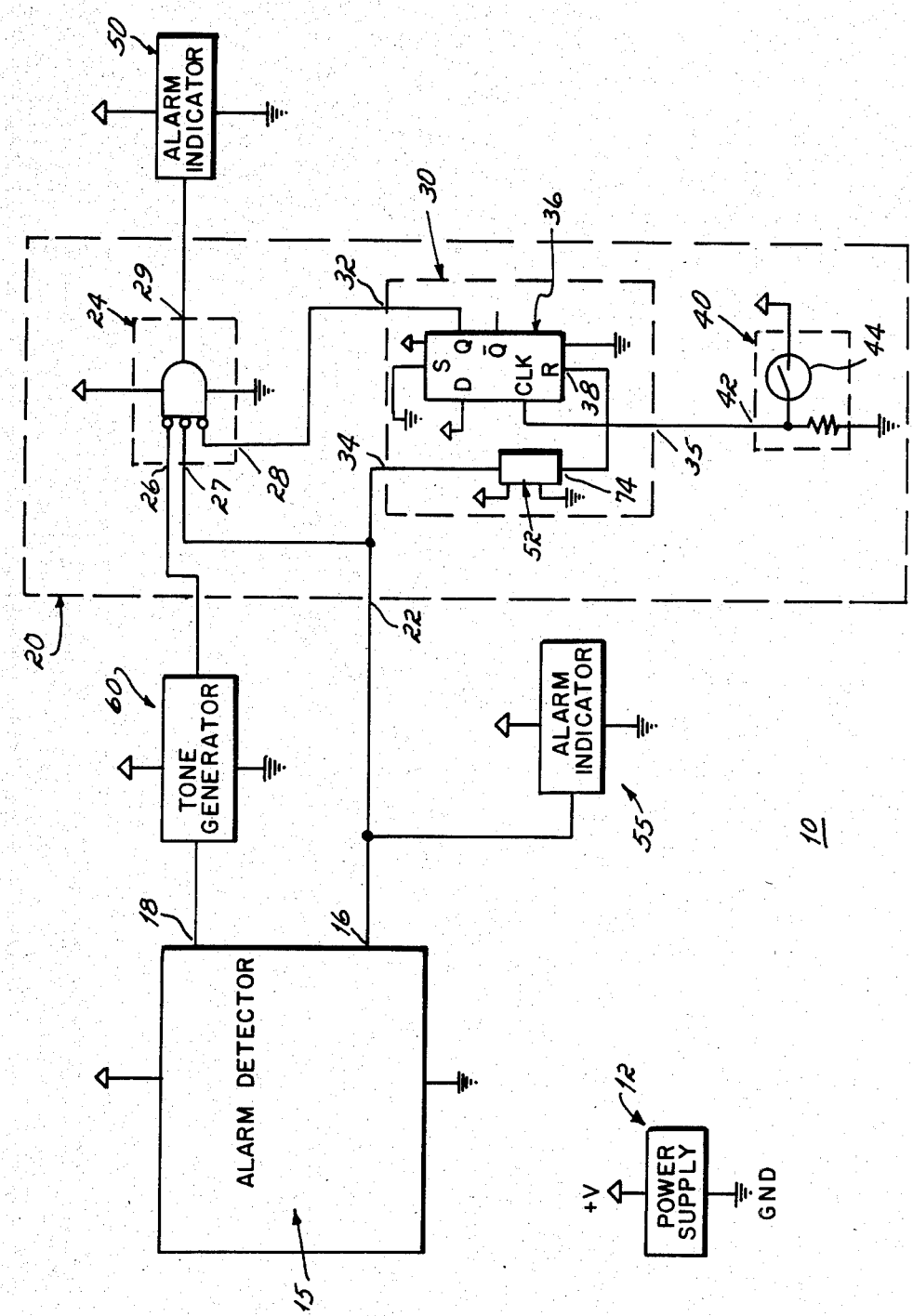

POLICE RADAR WARNING RECEIVER WITH MUTE FUNCTION

The present invention is directed to an improvement in vehicle-mounted police radar warning receivers, and more particularly to such a receiver in which the alarm indicator can be selectively, temporarily disabled by the driver, but will automatically be re-enabled prior to the occurrence of a subsequent alarm condition.

Police radar operates in the X-band and K-band of the frequency spectrum as discussed in U.S. Pat. No. 4,313,216, assigned to Cincinnati Microwave, Inc., the assignee herein. There are, generally, two types of police radar. One emits a continuous radar signal so long as the radar unit is turned on. The other emits a brief burst of radar signal when the police officer triggers the unit. This latter type is referred to as pulsed or instant-on radar. Both continuous and pulsed radar may operate in the X-band or K-band.

A police radar warning receiver is an electronic assembly mountable in a vehicle, such as a passenger car or truck, motorcycle, boat or the like, which travels on land or water in areas subject to speed-monitoring radar surveillance by police, and functions to detect the presence of the police radar and provide the driver or user with an audible and/or visual indication that his speed is being checked by radar. The receiver is contained in a box-like housing which is set on the dash or clipped to the visor in the vehicle. Extending from the rear of the housing is a power cord which terminates in a plug adapted to be received in the cigarette lighter socket. The front panel of the receiver faces the driver and has various indicators and control knobs.

When police radar is operating within range of the radar warning receiver, the driver is alerted by an alarm. For example, a light will be energized or an audible tone generated, or both.

In the ESCORT radar warning receiver, manufactured by the assignee herein, Cincinnati Microwave, Inc., of Cincinnati, Ohio, when an alarm condition exists, i.e., when police radar is detected, both an amber light is energized and an audible tone is generated.

The circuitry employed in the ESCORT radar warning receiver to determine whether police radar signals are present is disclosed in aforementioned U.S. Pat. No. 4,313,216, and U.S. patent application Ser. No. 575,422, filed Jan. 31, 1984, which is also assigned to Cincinnati Microwave, Inc.

Both the visual and audible alarms in the ESCORT radar warning receiver are energized for a minimum of about 4 seconds whenever a police radar signal is detected. Thus, even when pulsed radar is employed, the driver is alerted. Such signals might otherwise not be noticed as they occur for such a brief period of time. Also, if the police officer triggers the unit within four seconds of the first trigger, the ESCORT radar warning receiver's alarm will remain energized rather than provide a new warning.

Similarly, with continuous radar, the alarms are energized for as long as the radar warning receiver can detect the radar signal plus the four additional seconds.

The ESCORT radar warning receiver is sensitive enough to detect a police radar signal even though the radar unit may be some distance away. As a result, the vehicle in which the radar warning receiver is mounted may travel quite a distance before the radar signal becomes too weak to detect. Hence, the alarms are likely to be energized for quite some time.

During prolonged alarm conditions, the audible alarm may tend to become an annoyance. Similarly, at night, the light may become a distraction. Once the alarm is noticed, which would be expected to occur almost immediately after the alarms are energized, the driver may prefer to disable the audible alarm, for example, for the remaining time during which the police radar signal is detectable.

Alarm defeat schemes have been known which use a mechanical switch to interrupt the electrical signal energizing the alarm. With this type of defeat mechanism, once disabled, the alarm indicator ceases to function until the switch is again manually actuated to re-enable or re-energize the indicator. The exclusive use of such defeat mechanisms in a police radar warning receiver would not always be satisfactory, as the driver may forget to actuate the switch to re-enable the alarm indicator, thereby possibly missing the next occurrence of an alarm condition. Some drivers may refrain from using such defeat mechanisms rather than pay undue attention to other indicators on the receiver which provide information indicating that the previous alarm condition has terminated.

Accordingly, it has been an object of the present invention to provide a radar warning receiver in which the alarm indicator can be disabled once the alarm condition is acknowledged, but which will automatically be re-enabled to respond to a subsequent alarm condition.

That objective has been accomplished by providing a radar warning receiver having an alarm indicator responsive to an electronic switch, the switch being activated and energizing the alarm in response to an alarm signal indicating the presence of a police radar signal, the switch being deactivated and de-energizing the alarm in response to a momentary mute signal occurring during the occurrence of the alarm signal, the switch remaining deactivated until the alarm condition signal terminates and subsequently reoccurs.

The objective and features of the invention will become more readily apparent from the following detailed description taken with the accompanying drawings in which the FIGURE is a schematic representation of a preferred embodiment of the radar warning receiver of the present invention.

With reference to the FIGURE, there is schematically shown the radar warning receiver 10 of the present invention.

Receiver 10 is comprised of an alarm condition detector 15, an audible tone generator 60, electronic switch 20, audible alarm indicator 50, visible alarm indicator 55, and power supply 12.

Power supply 12 is preferably a suitable power plug 12 which is adapted to be received in a vehicle cigarette lighter socket (not shown), such as is disclosed in concurrently filed U.S. patent application Ser. No. 656,157, entitled "Radar Warning Receiver with Power Plug" invented by Richard L. Grimsley, and Gregory R. Furnish, and assigned to Cincinnati Microwave, Inc. The disclosure thereof is incorporated herein by reference. Plug 12 has suitable power supply taps +V and GND to power the remaining receiver components.

Also incorporated herein by reference are the aforesaid U.S. Pat. No. 4,313,216 and U.S. patent application Ser. No. 575,422, which disclose radar warning receiver circuitry as used herein except for certain features of electronic switch 20. Finally, concurrently filed U.S.

patent application Ser. No. 656,026, entitled "Police Radar Warning Receiver", invented by John R. Fende, Gregory R. Furnish, and Richard L. Grimsley, assigned to Cincinnati Microwave, Inc., is incorporated herein by reference and discloses a radar warning receiver suitable for use in the present invention.

Alarm condition detector 15, which determines whether a police radar signal is present thereby indicating an alarm condition, has its alarm signal output 16 coupled to alarm indicator 55 and to input 22 of electronic switch 20. Alarm condition detector 15 also has an output 18 which energizes tone generator 60 when an alarm condition occurs. Tone generator 60 is coupled to electronic switch 20 and as will be discussed, provides the audible tone heard from alarm indicator 50 when the latter is energized.

When the alarm condition exists, output 16 switches from a high voltage, approximately equal to +V to a low voltage approximately equal to GND. These voltages are referred to as "high" and "low," respectively. When output 16 is "high," that indicates that no alarm condition exists. Similarly, when output 16 switches "low," that indicates the presence of an alarm condition. Output 16 remains "low" at least throughout the period during which the alarm condition exists. When output 16 switches "low," indicator 55 will be energized. Alarm indicator 55 preferably includes a lamp and appropriate driver circuitry therefor, thereby producing a visual alarm.

Further, upon output 16 going "low," alarm indicator 50 will be energized and coupled to tone generator 60. Indicator 50 preferably includes an amplifier, volume control and speaker, thereby producing an audible alarm.

When the alarm condition terminates, output 16 will switch "high." A "high" on output 16 resets switch 20 to insure that indicator 50 will again be energized when output 16 again goes "low" in response to a subsequent alarm condition.

Electronic switch 20 may be clocked, as will be discussed, which will cause switch 20 to interrupt the connection between generator 60 and indicator 50. Thus, indicator 50 will be de-energized until switch 20 is reset by output 16 going "high."

In the preferred embodiment, electronic switch 20 includes a first switch 24 having one input 26 coupled to tone generator 60, a second input 27 coupled to input 22 of electronic switch 20, and a third input 28 coupled to output 32 of a second switch 30.

Second switch 30 has a first input 34 also coupled to input 22 of electronic switch 20, and a second input 35 coupled to the output 42 of pulser 40. Output 42 is typically "low" and emits a short "high" pulse or momentary mute signal when actuated as will be discussed.

Switch 24, when energized, or ON, couples tone generator 60 to alarm indicator 50 via output 29. Switch 24 is energized only when both output 16 of detector 15 and output 32 of switch 30 are "low." Output 32 is typically "low," providing an enable signal, unless switch 30 is clocked to a mute signal on input 35 while input 22 is "low." Once a mute signal is received (and if input 22 is "low"), output 32 goes "high," providing a disable signal. Output 32 will remain "high" until output 16 goes "high," resetting switch 30 which again provides an enable signal. Until output 16 goes "low" again, switch 24 will be de-energized, or OFF, thereby disabling indicator 50.

Pulser 40 includes a two-terminal or two-pole, manually operable, momentary switch 44, one terminal of which is coupled to +V, and the other terminal of which is coupled to output 42 and further coupled to GND via resistor 48.

In operation, the existence of an alarm condition will result in energization of alarm indicators 50 and 55. Once a user (not shown) has become aware of the alarm condition by hearing or seeing the alarm indicator 50 or 55, respectively, the user may momentarily depress switch 44, generating the mute pulse, causing switch 30 to clock and change its output 32 to a "high," thereby providing a disable signal and terminating the audible alarm from indicator 50. Indicator 50 remains de-energized until the alarm condition terminates.

Switch 30 includes a D-type flip flop 70, such as is contained in a 4013 type integrated circuit. The D-input 36 of switch 30 is tied "high," while S-input 37 is tied "low". As is well understood, a D-type flip flop having these inputs clocks only on the transition from "low" to "high" on input 35. Hence, once clocked, switch 30 will continue to provide a disable signal on output 32 unless a "high" reset signal, indicating a non-alarm condition, is received on reset input 38. Accordingly, switch 30 is responsive to output 16 and will continue to provide a disable signal on output 32 until a non-alarm condition signal is received in input 38.

In order to prevent re-energization of the alarm indicator during only a temporary hiatus of alarm condition, such as would occur with pulsed radar or where the radar signal fades in or out, alarm condition detector 15 includes a retriggerable one-shot (not shown) which maintains the alarm condition signal on output 16 for the duration of an alarm condition and for approximately four seconds thereafter. Thus, until four seconds has elapsed after an alarm condition actually ceases, output 16 will remain low, thus maintaining a disable signal on output 32. Once that interval has elapsed, output 32 returns to the enable signal state and alarm 50 will once again be energized when output 16 again assumes the alarm condition state.

Switch 30 preferably includes a retriggerable one-shot 52 between input 34 and reset input 38 of flip flop 70. One-shot 52 preferably has a four second period. When triggered by the presence of a "low" on input 34, one-shot 52 provides a "low" on output 74 which is coupled to reset input 38. Output 74 remains "low" until four seconds after input 34 is provided a "high," thus preventing re-energization of alarm indicator 50 until about 8 seconds after the first alarm condition has terminated. Any subsequent alarm condition occurring during that 8 second interval will retrigger one-shot 52, thereby maintaining alarm indicator 50 in the de-energized state.

One-shot 52 may be replaced with a short circuit, in which case the interval will be the previously discussed four seconds provided by detector 15.

Switch 24 is preferably a three input NOR gate, such as a 4025 integrated circuit.

In the preferred embodiment, alarm indicator 55 is not affected, although by modifying the circuitry, switch 20 could operate on alarm indicator 55 alone or in conjunction with alarm indicator 50, thereby providing a mute function for the visual alarm as well.

The foregoing is a preferred embodiment of a mute function for a radar warning receiver permitting an alarm indicator to be selectively, temporarily disabled by the driver, but which is automatically re-enabled prior to occurrence of a subsequent alarm condition.

Having described the invention, what is claimed is:

1. A vehicle-mounted police radar warning receiver having an alarm indicator to indicate the presence of a police radar signal, said receiver adapted to allow de-energization of the alarm indicator during a first alarm signal while not preventing energization of the alarm indicator in response to a subsequent second alarm signal occurring more than a predetermined time after the first alarm signal terminates, said receiver comprising:

an alarm indicator;

alarm signal generator means for detecting the presence of a police radar signal and for generating an alarm signal during an interval in which said police radar signal is detected and for generating a no-alarm signal in the absence of said police radar signal being detected;

mute means for generating a mute signal;

electronic switch means responsive to said alarm signal generator means and said mute means for energizing and de-energizing said alarm indicator, said electronic switch means comprising:

first switch means having an ON state and an OFF state for energizing said alarm indicator only in said first switch means ON state;

second switch means having an output coupled to said first switch means, said second switch means output having an enable state and a disable state, for causing said first switch means to be in said ON state in response to said enable state and said alarm signal and for causing said first switch means to be in said OFF state in response to said disable state; and timer means being responsive to said alarm generator means for generating an allow signal between onset of said alarm signal and a predetermined time after said alarm signal ceases;

said second switch means being responsive to said mute means and said timer means, said second switch means initially being in said enable state and thereafter being switchable to said disable state in response to said mute signal being generated while said allow signal is being generated whereby said alarm indicator is de-energized; said second switch means remaining in said disable state until said allow signal ceases and thereafter switching to said enable state whereby generation of a second said alarm signal will not cause said alarm indicator to be energized unless said second alarm signal is generated said predetermined time after a first said alarm signal ceases.

2. A method of controlling a vehicle-mounted police radar detector alarm indicator comprising:

generating an alarm signal in response to detectable presence of a police radar signal;

energizing an alarm indicator in response to initial generation of said alarm signal;

selectively generating a mute signal while said alarm indicator is energized;

de-energizing the alarm indicator in response to said mute signal;

continuing to de-energize the alarm indicator until a predetermined time after the alarm signal terminates;

terminating the alarm signal in response to the termination of the detectable presence of police radar signal whereby a subsequent detectable presence of a police radar signal will again generate an alarm signal but will not energize the alarm indicator unless the alarm signal is again generated after said predetermined time.

3. The vehicle-mounted police radar warning receiver of claim 1, said predetermined time being several seconds.

4. The vehicle-mounted police radar warning receiver of claim 3, said predetermined time being four seconds.

5. The vehicle-mounted police radar warning receiver of claim 3, said predetermined time being eight seconds.

6. The method of claim 2, said predetermined time being several seconds.

7. The method of claim 6, said predetermined time being four seconds.

8. The method of claim 6, said predetermined time being eight seconds.

9. The vehicle-mounted police radar warning receiver of claim 1 further comprising:

a second alarm indicator;

means for energizing said second alarm indicator while said alarm signal is being generated.

10. The vehicle-mounted police radar warning receiver of claim 3 further comprising:

a second alarm indicator;

means for energizing said second alarm indicator while said alarm signal is being generated.

11. The vehicle-mounted police radar warning receiver of claim 4 further comprising:

a second alarm indicator;

means for energizing said second alarm indicator while said alarm signal is being generated.

12. The vehicle-mounted police radar warning receiver of claim 5 further comprising:

a second alarm indicator;

means for energizing said second alarm indicator while said alarm signal is being generated.

13. The method of claim 2 further comprising:

energizing a second alarm indicator in response to initial generation of said alarm signal; and de-energizing said second alarm indicator in response to the termination of the detectable presence of police radar signal.

14. The method of claim 6 further comprising:

energizing a second alarm indicator in response to initial generation of said alarm signal; and de-energizing said second alarm indicator in response to the termination of the detectable presence of police radar signal.

15. The method of claim 7 further comprising:

energizing a second alarm indicator in response to initial generation of said alarm signal; and de-energizing said second alarm indicator in response to the termination of the detectable presence of police radar signal.

16. The method of claim 8 further comprising:

energizing a second alarm indicator in response to initial generation of said alarm signal; and de-energizing said second alarm indicator in response to the termination of the detectable presence of police radar signal.

* * * * *